April 9, 1940.　　　　H. L. CONRAD　　　　2,196,251
PRESSURE REGULATOR INDICATOR FOR FLUIDS
Filed Aug. 14, 1937　　　2 Sheets-Sheet 2
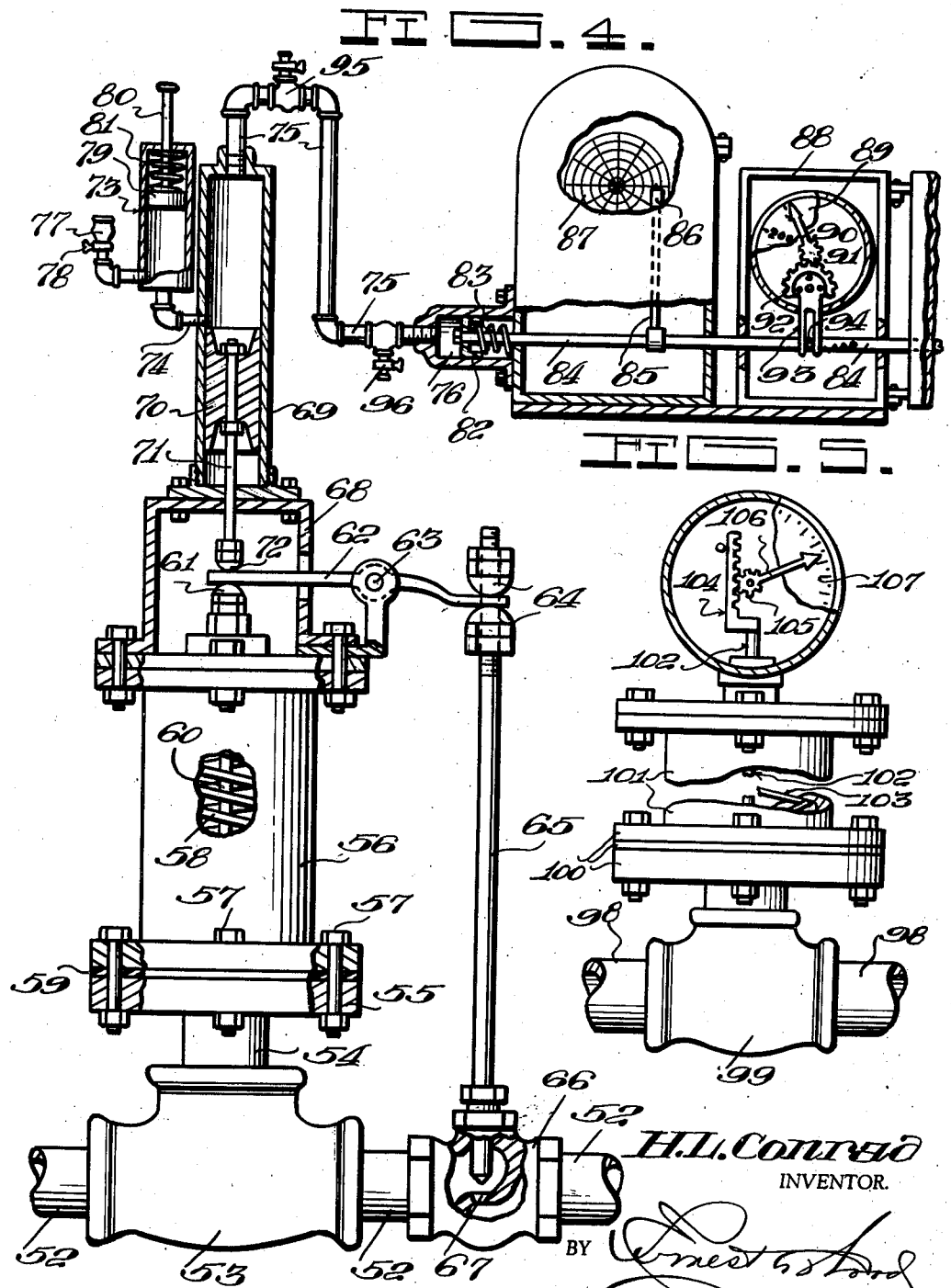

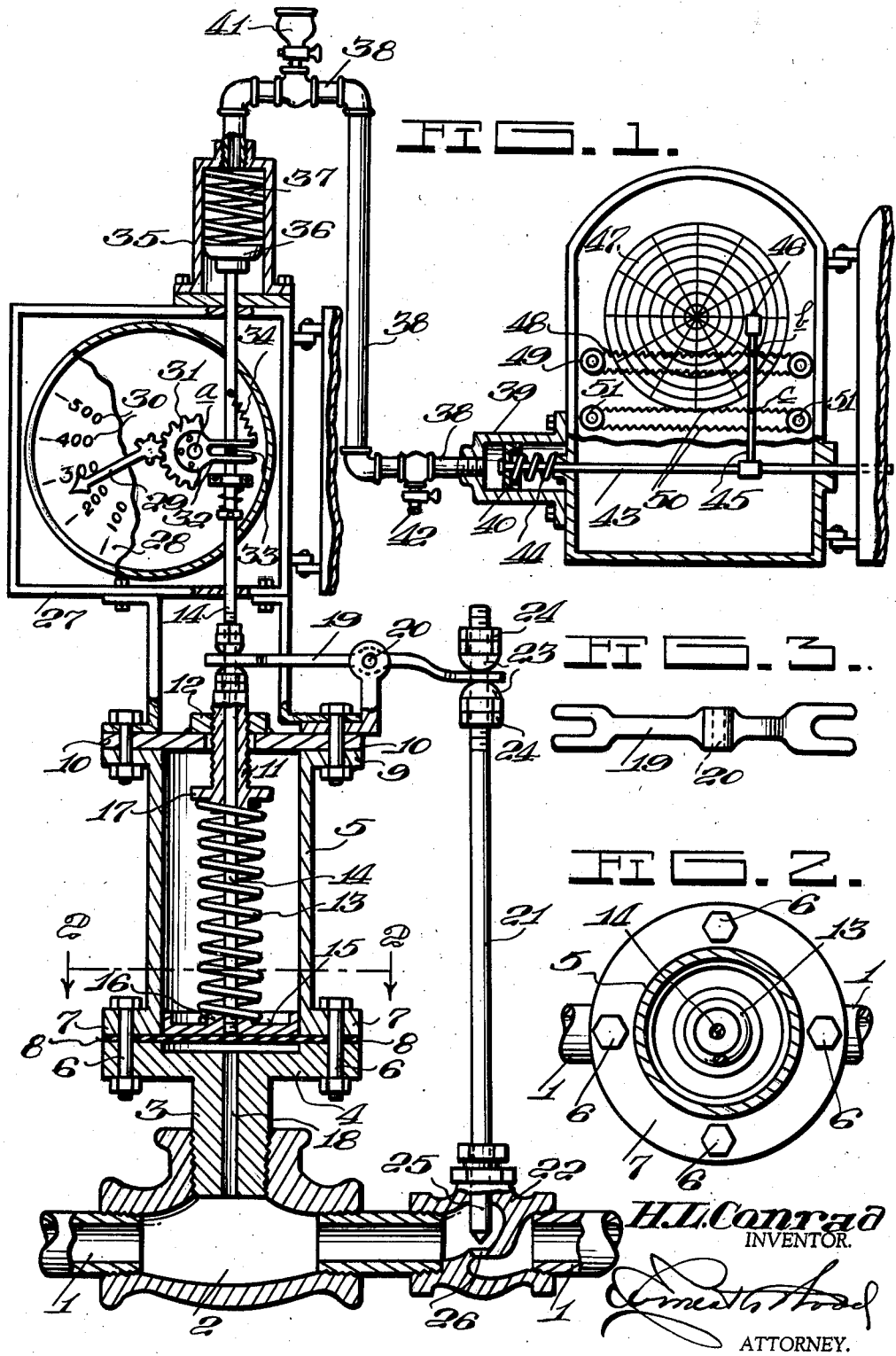

Patented Apr. 9, 1940

2,196,251

UNITED STATES PATENT OFFICE 2,196,251

PRESSURE REGULATOR INDICATOR FOR FLUIDS

Harold L. Conrad, Oklahoma City, Okla.

Application August 14, 1937, Serial No. 159,167

1 Claim. (Cl. 50—26)

This invention relates to pressure indicators and regulators for fluid lines and it has particular reference to such apparatus designed to regulate and continuously indicate both visibly and permanently, pressure changes in gas, steam and other fluid lines.

The principal object of the invention is to provide automatic means responsive to varying pressures in a supply line for maintaining a given pressure at the point of discharge, and for simultaneously denoting on a dial and on a chart the pressure differentials, whereby a visible as well as a permanent record of such pressure changes may be had.

Another object of the invention is to provide fluid actuated means for operating the visible and permanent indicators of the system and which means, being first charged with fluid, is automatically held to efficiency by an auxiliary replenishing cylinder and reservoir having communication with the control cylinder of the system.

With the foregoing objects as paramount, the invention has particular reference to its salient features of construction and arrangement of parts which will become manifest as the description proceeds, taken in connection with the accompanying drawings, wherein:

Figure 1 is a diagrammatic as well as a vertical section through a system constructed according to the present invention.

Figure 2 is a transverse section on lines 2—2 on Figure 1.

Figure 3 is a detail plan view of the bifurcated arm transmitting motion from the fluid line to the fluid operating means for actuating the recording elements.

Figure 4 is a modified form of system, employing full fluid instead of mechanical means for transmitting motion to the indicating means to denote change in fluid pressure in the fluid line, and Figure 5 is a detail view, partly in section and partly broken away, showing a further modified form and illustrating a direct movement of the pressure indicating means through a diaphragm from the pressure line.

Continuing with a more detailed description of the drawing, reference is primarily made to Figure 1 in which is shown the fluid supply line 1. A three-way coupling 2 is provided in the line and into which is threaded the male nipple 3 of the flange 4. A cylinder 5 is mounted atop the flange 4 and is secured thereto by bolts 6, passing through an annular flange 7, integral with the skirt of cylinder 5. A flexible diaphragm 8 is interposed between the two flanges 4 and 7 as shown in Figure 1. Further reference to this diaphragm will be made presently.

The cylinder 5 has an integral upper flange 9 surmounted by a disc plate 10 of metal, serving as a mounting for the adjusting nut 11, which latter is exteriorly threaded to engage the threads of the boss 12, which is welded to the said plate 10.

The nut 11 serves to vary or adjust the pressure of the spring 13, which surrounds a rod 14, extending axially through the cylinder 5. The rod 14 is threaded at its lower end into the center of a member 15, in the base of the cylinder 5, and which latter rests on the diaphragm 8. The spring, at its lower end, embraces a boss 16 and engages a flange 17 at its upper end and this flange is integral with the nut or threaded plug 11. Accordingly, it will be seen that pressure increases in the coupling 2 occurring in line 1 will expand the diaphragm 8 through the central passage 18 in the nipple 3, and in so doing, will exert an upward urge on the rod or stem 14, against the resistance of spring 13, which latter holds member 15 yieldingly against the diaphragm 8. As the rod or stem 14 moves upwardly or downwardly, it elevates or lowers the engaging end of the bifurcated arm 19, (shown in Figure 3), causing the same to pivot on its bearing 20, thereby raising or lowering the arm or rod 21, which is freely movable in the valve body 22, but is controlled or adjusted in its movements by semi-spherical nuts 23, opposed by adjusting nuts 24, adjacent its connection with the bifurcated arm 19, as shown in Figure 1.

The lower end of the rod 21 is pointed at 25, to correspond with an aperture 26 in the valve casting or body 22. Thus it will be seen that the movements of the rod 14, caused by varying fluid pressures in the line 1, will impart to rod 21, analogous movements, to open and close the orifice in the valve body 22, through the valve 25 carried on the end of rod 21.

Accordingly, when the pressure in line 1 is increased above the prerequisite, valve 25 moves toward closed position, due to the responsiveness of the diaphragm 8 to the rise in pressure. Obviously, a decrease in pressure in the line will have a negative effect upon the system to open the valve or to vary its movement relative to its seat in accordance with the variations in fluid pressure, as described.

Now, in order to translate the pressure differentials in terms of pounds for visible and in fact, permanent record, a system such as shown in Figure 1 is provided and which consists of a continuation of the rod 14, through a housing 27, containing the visible indicator dial 28 and its associated mechanism. The latter consists of a pointer 29, passing over the predetermined calculations 30 by virtue of the toothed connection between the same and the quadrant 31.

The quadrant 31 is pivoted at a, and it is provided with a bifurcated tail portion 32, which straddles a pin 33, carried by the continuation of rod 14. A coiled spring 34 serves to lend resistance to the quadrant 31, by reason of its connection to the tail of the same and to the upper part of the said rod 14.

Above the housing 27, there is provided a small cylinder 35, into which the upper end of the rod 14 extends. A piston 36 is carried by the upper end of the rod and is resisted by the pressure of spring 37.

The cylinder 35 contains fluid to the full capacity of the cylinder 35, line 38 and that portion of cylinder 39, rearwardly of the piston 40. A filler valve 41 is provided in the line 38, as well as a bleeder valve 42.

The piston 40 is mounted on the shaft 43, with a spring 44 resisting ingress of pressure into the cylinder 39. An arm 45 is mounted on shaft 43 and carries a stylus 46, operating on a concentrically and radially configurated dial 47 operated by a conventional clock-mechanism, not shown. It is not considered necessary to illustrate any part of the clock mechanism for rotating dial 47 inasmuch as this mechanism is common and well known and its only function is to rotate the dial 47 in accordance with a prearranged schedule. This, together with the transcriptions of the stylus 46, affords an accurate knowledge of the varying pressures of fluid in the line 1 over a given period of time.

A spring belt 48 surrounding grooved rollers 49, and a companion belt 50, surrounding rollers 51, both connected to the sliding arm 45, serve to stabilize the same in its movements and maintain correct position of the stylus 46 on the dial during its movements thereover. The upper lead of belt 48 is connected at b to the stylus while the upper lead of belt 50 is connected thereto at c.

The foregoing describes the structure shown in Figures 1 to 3 inclusive, setting forth the semi-fluid method of producing a method of obtaining a record of varying pressures in the fluid line 1. In the following, the structure shown in Figure 4 is described.

In Figure 4, the fluid line is designated at 52, entering the coupling 53, which latter has a riser 54 having a flange 55. A cylinder 56 is mounted on the flange 55 and secured by means of bolts 57, and contains a spring 58 whose function is to resist pressure imposed on the diaphragm 59, by pressure rises in the line 52. A rod 60 extends upwardly through the top of the cylinder 56 and carries a semi-spherical nut 61, engaging the bifurcated arm 62, the latter being pivoted at 63. The opposite end of the arm 62 is disposed between semi-spherical nuts 64, on the rod 65, which latter enters the valve body 66 as a valve to open and close the port on orifice 67 as the pressure in line 52 increases and decreases.

The foregoing structure is similar to that shown in the lower portion of Figure 1, and its operation is likewise the same. However, means for translating movement of the mechanism to operate the recording means in the last described structure differs materially in structure but is the same in principle.

Mounted on the cylinder 56 is a frame 68 and upon this frame is disposed a cylinder 69. A piston 70 operates within this cylinder on a rod 71, the latter extending downwardly into the frame 68 to engage the arm 62. A ball nut 72 is carried by the end of the rod for actual engagement with said arm.

A recharging reservoir 73 is mounted alongside the cylinder 69 and has communication therewith through the medium of the pipe 74, which enters the cylinder 69 immediately above the lowest point to which the piston 70 moves therein.

It will be understood that the fluid system, which includes the cylinder 69, pipe 75 and cylinder 76 is primarily charged to capacity with operating fluid. Any leakage is replaced continuously by fluid from the reservoir 73 in a manner to be presently explained.

After charging the system, the reservoir 73 is filled through the medium of the cup 77, by opening valve 78 and raising the piston 79, by means of the rod 80. The spring 81 maintains a pressure on the fluid in the reservoir cylinder 73 at all times.

In operation, when an increase in fluid pressure occurs in the line 52, diaphragm 59 is expanded to raise the rod 60 against the resistance of spring 58. In raising the rod, arm 62 is pivoted on its axis 63, thereby lowering rod 65 to move its lower end toward the orifice 67, tending to close the same, thereby reducing the fluid pressure beyond the valve 66.

At the same instant, rod 71 of the fluid system is moved upward, causing similar movement of piston 70 against fluid pressure in the upper portion of cylinder 69. Fluid therein is displaced through pipe 75 to actuate piston 82 in cylinder 76, against the resistance of spring 83, to effect longitudinal movement of rod 84.

Rod 84 carries the stylus arm 85, supporting the stylus 86, operating on the dial 87. Mechanism for rotating the dial in accordance with a given time schedule is not shown, this being conventional clock-mechanism of ordinary construction.

Adjacent the permanent recorder, comprising the dial 87 and its stylus 86, there is mounted a casing 88, containing a fixed dial 89, over which moves a pointer 90. The pointer 90 has a pinion or a segment thereof 91 whose teeth enmesh those of a tooth quadrant 92, mounted on a bifurcated arm 93. The bifurcated end of the arm 93 straddles a pin 94, carried by a continuation of rod 84, to which the stylus arm 85 is attached. Hence, the movements of the stylus arm 85 and the bifurcated arm 93 will be identical in degree to the longitudinal displacement of rod 84. The effects of this on the stylus 86 are obvious but in the case of the pointer 90, it is to be noted that its movements relative to the configurations on dial 89 are calculated so that a glance at the same by an attendant or operator will disclose instantly what the dial 87 will preserve as a permanent record.

With further reference to the recharging assembly; it will be observed that the fluid in the reservoir 73 is under constant pressure of spring 81, it being remembered that the recording system is filled to capacity. Should, for any reason, the fluid in the system fall below normal, the cylinder 69 will receive a charge from the reservoir when the piston 70 moves to a point below the inlet of pipe 74 of the reservoir, the fluid being under pressure of the spring pressed piston 79.

In order to relieve the system of any air, a bleeder valve 95 is provided in the pipe 75 while a filler valve 96 serves as a means for introducing fluid into the system.

It is apparent from the foregoing that as pressure on the fluid passing through line 52 changes, such changes will affect the diaphragm 59 and in doing so, rod 60 will be moved longitudinally to actuate the valve rod 65 to vary the size of the orifice 67 and will simultaneously move the rod 71 vertically. Piston 70 will thus be actuated to displace fluid in the cylinder 69. Such action will move the smaller piston 82 in its cylinder 76 to effect longitudinal movement of rod 84. The rod 84 is moved in proportion to variations in fluid pressure in line 52 and since the stylus 86 and pointer 90 are operatively connected to the rod 84, both visible and permanent recordings of pressure differentials are obtained.

In the event it is desired to indicate visibly the pressure of fluid in a pressure line 98, without the attendant control valve, a connection 99 is made to the line 98 on which is mounted the diaphragm assembly 100. The cylinder 101 contains a piston, comparable to the member 15 in Figure 1, a rod 102 and a spring 103, bearing on the piston, as in the preceding case. The rod 102 is secured directly to the rack 104 and when the pressure in line 98 actuates the diaphragm in cylinder 101, the rod and rack transmit this movement to pinion 105 to move the pointer 106 over the dial 107.

Manifestly, the construction as shown and described is capable of some modification and such modification as may be construed within the scope and meaning of the appended claim is also considered to be within the spirit and intent of the invention.

What is claimed is:

Apparatus for visibly determining the fluctuations in fluid pressure lines, the combination comprising a housing containing a fluid actuated diaphragm and having communication with a pressure line, an indicator dial, a pointer movable thereover, a spring loaded rod actuated by pulsations of said fluid actuated diaphragm and having operative fluid connection with said pointer, a needle valve in said pressure line and pivoted means having operative connection with said needle valve and said spring loaded rod for actuating said needle valve upon movement of said fluid actuated diaphragm.

HAROLD L. CONRAD.